3,489,751
7-AMINO-CEPHALOSPORANIC AND DECEPHALO-SPORANIC ACID DERIVATIVES
Leonard Bruce Crast, Jr., North Syracuse, N.Y., assignor to Bristol-Myers Company, New York, N.Y., a corporation of Delaware
No Drawing. Filed Sept. 5, 1967, Ser. No. 665,255
Int. Cl. C07d 99/24; A61k 21/00
U.S. Cl. 260—243                                    13 Claims

ABSTRACT OF THE DISCLOSURE

7-[D-(—)-α-amino-α-(3 - chloro - 4-hydroxyphenyl)-acetamido]cephalosporanic acid and D - (—) - 7 - [2,2-dimethyl-4-(3-chloro-4-hydroxyphenyl) - 5-oxo-1-imidazolidinyl]cephalsporanic acid and the corresponding decephalosporanic acids and the salts thereof are new synthetic compounds of value as antibacterial agents and in the treatment of bacterial infections.

BACKGROUND OF THE INVENTION

Field of the invention

This invention relates to novel synthetic compounds of value as antibacterial agents, as nutritional supplements in animal feeds, as agents for the treatment of mastitis in cattle and as therapeutic agents in poultry and animals, including man, in the treatment of infectious diseases caused by gram-positive and gram-negative bacteria.

Description of the prior art

There exists a need to provide alternative and improved agents for the treatment of infections caused by gram-positive and gram-negative bacteria, particularly for the treatment of infections caused by resistant strains of bacteria, e.g. benzylpenicillin-resistant strains of *Staphylococcus aureus* (*Micrococcus pyogenes* var. *aureus*), or for the decontamination of objects bearing such organisms, e.g. hospital equipment, walls of operating rooms and the like. Of particular need are antibacterial agents which exhibit good oral absorption in animals.

SUMMARY OF THE INVENTION

The compounds of this invention are 7-[D-(—)-α-amino-α-(3-chloro-4-hydroxyphenyl)-acetamido] - acetamido]cephalosporanic acid having the formula

I.

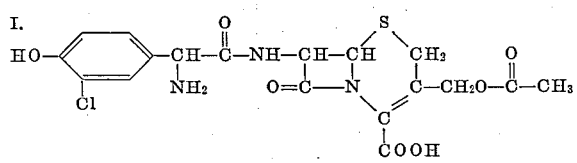

7-[D-(—) - α - amino - α - (3 - chloro-4-hydroxyphenyl)-acetamido]-decephalosporanic acid also named 7-[D-(—)-α-amino - α - (3 - chloro-4-hydroxyphenyl)-aceta- mido]-3-methyl-3-cephem-5-carboxylic acid having the formula

II.

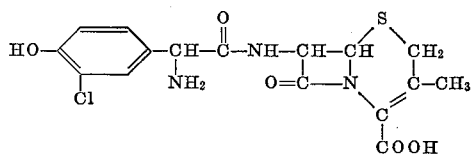

7-[D-(—)-2,2-dimethyl-4-(3-chloro - 4 - hydroxyphenyl)-5-oxo-1-imidazolidinyl]cephalosporanic acid having the formula

III.

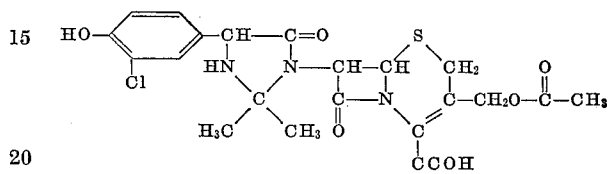

and 7-[D-(—) - 2,2-dimethyl - 4 - (3-chloro-4-hydroxyphenyl)-5-oxo-1-imidazolidinyl] - decephalosporanic acid also named 7-[D-(—)-2,2-dimethyl-4-(3-chloro-4- hydroxyphenyl)-5-oxo-1-imidazolidinyl] - 3 - methyl-3-cephem-5-carboxylic acid having the formula

IV.

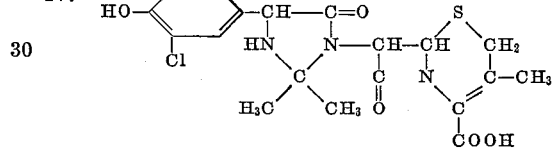

and the nontoxic pharmaceutically acceptable salts thereof.

The nontoxic, pharmaceutically acceptable salts include, for example, (1) nontoxic pharmaceutically acceptable salts of the acidic carboxylic acid group such as the sodium, potassium, calcium, aluminum and ammonium salts and nontoxic substituted ammonium salts with amines such as tri (lower)alkylamines, procaine, dibenzylamine, N - benzyl-beta-phenethylamine, 1-ephenamine, N,N' - dibenzylethylenediamine, dehydroabietylamine, N,N'-bis-dehydroabietylethylenediamine, N-(lower)alkylpiperidines, such as N-ethylpiperidine and other amines which have been used to form salts of benzylpenicillin; and (2) nontoxic pharmaceutically acceptable acid addition salts (i.e. salts of the basic nitrogen) such as (a) the mineral acid addition such as the hydrochloride, hydrobromide, hydroiodide, sulfate, sulfamate, sulfonate, phosphate, etc. and (b) the organic acid addition salts such as the maleate, acetate, citrate, tartrate, oxalate, succinate, benzoate, fumarate, malate, mandelate, ascorbate, β-naphthalene sulfonate, p-toluenesulfonate and the like. Also included are the easily hydrolyzed esters or amides of such acids which may be converted to the free acid form by chemical or enzymatic hydrolysis.

The compounds of Formula I and Formula II of the present invention are prepared in the form in which the α-amino group is blocked by the reaction of 7-aminocephalosporanic acid or 7-aminodecephalosporanic acid described in U.S. Patent No. 3,268,623 (preferably in the form of a neutral salt such as the sodium salt or the triethylamine salt) with a mixed anhydride e.g. mixed anhydride obtained from reaction with ethyl chlorocarbonate, of an acid having the formula

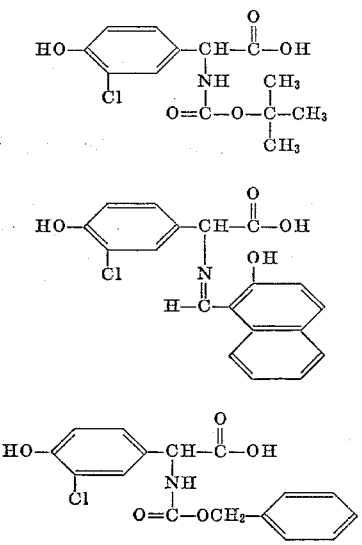

or the formula

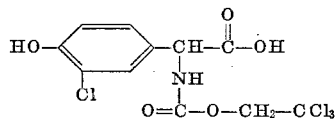

or with its functional equivalent as an acylating agent for a primary amino group. Such mixed anhydrides include particularly the mixed anhydrides prepared from stronger acids such as the lower aliphatic monoesters of carbonic acid, of alkyl and aryl sulfonic acids and of more hindered acids such as diphenylacetic acid. Such equivalents include the corresponding carboxylic chlorides, bromides, and then acid anhydrides. In addition, an acid azide or an active ester or thioester (e.g. with p-nitro-phenol, 2,4-dinitrophenol, thiophenol, thioacetic acid) may be used or the free acid itself may be coupled with 7-aminocephalosporanic acid or 7-aminodecephalosporanic acid after first reacting said free acid with N,N'-dimethylchloroformiminium chloride [cf. Great Britain 1,008,170 and Novak and Weichet, Experientia XXI/6, 360 (1965)] or by the use of enzymes or of an N,N'-carbonyldiimidazole or an N,N'-carbonylditriazole [cf. South African patent specification 63/2,684] of a carbodiimide reagent [especially N, N'-dicyclohexylcarbodiimide, N,N' - dissopropylcarbodiimide or N-cyclohexyl-N'-(2 - morpholinoethyl)carbodiimide; cf. Sheehan and Hess, J. Amer. Chem. Soc. 77, 1067, (1955)], or of alkynylamine reagent [cf. R Buijle and H. G. Viehe, Angew. Chem. International Edition 3, 582 (1964)], or of a ketenimine reagent [cf. C. L. Stevens and M. E. Monk, J. Amer. Chem. Soc 80, 4065 (1958)] or of an isoxazolium salt reagent [cf. R. B. Woodward, R. A. Olofson and H. Mayer, J. Amer. Chem. Soc. 83, 1010 (1961)]. Another equivalent of the acid chloride is a corresponding azolide, i.e. an amide of the corresponding acid whose amide nitrogen is a member of a quasiaromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated, but this is not essential. The methods for methods for carrying out these reactions to produce a cephalosporin and the methods used to isolate the cephalosporin so-produced are well-known in the art (cf. U.S. Patents Nos. 3,079,314, 3,117,126 and 3,129,225 and British Patents Nos. 932,644, 957,570, and 959,054.

The blocking group is then removed to form the products of the present invention, i.e. the t-butoxycarbonyl group is removed by treatment with formic acid, the carbobenzyloxy group is removed by catalytic hydrogenation, the 2-hydroxy-1-naphthcarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

The compounds of Formulas III and IV of the present invention are prepared by reaction of acetone with the corresponding cephalosporin of Formula I or II.

Although some reaction will occur no matter what molar proportion of reactants is used, it is preferable in order to obtain maximum yields to use a molar excess of the acetone and the latter may be well be used as the reaction solvent. Water is split off during the reaction and it is thus preferable not to have a major amount of water in the reaction medium. The pH of the reaction mixture should be from about 5 to 9 and preferably on the alkaline side. The pH may be adjusted to within this range, if necessary, by the addition of an alkaline material such as, for example, sodium hydroxide, sodium carbonate, potassium hydroxide, potassium carbonate, ammonium hydroxide, ammonium carbonate, organic amines (e.g. triethylamine), etc.

The temperature during the reaction is not critical. The reaction will proceed satisfactorily at room temperature and may be hastened by heating.

Thus the present invention includes the process of preparing the compound of the formula

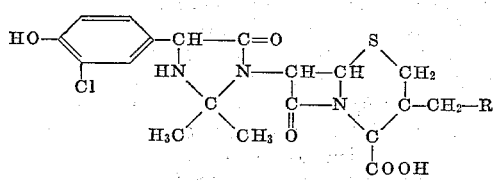

wherein R is hydrogen or acetoxy which comprises mixing a cephalosporin of Formula I or II with at least an equimolar weight of acetone in the absence of substantial amounts of water at a pH in the range of 5 to 9 and at a temperature in the range of −20° C. to +50° C.

D-(−)-2-(p-hydroxyphenyl)-glycine used as a starting material for the preparation of the compounds of this invention is prepared according to the following reaction scheme.

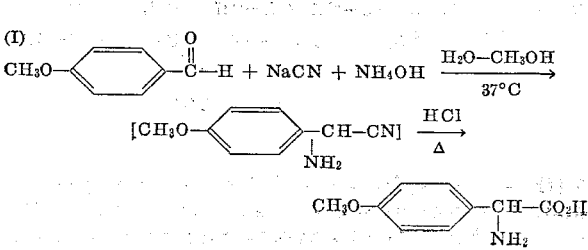

(II) 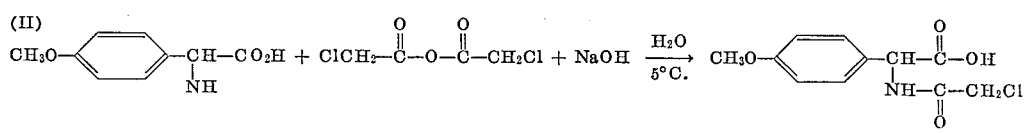

(III) 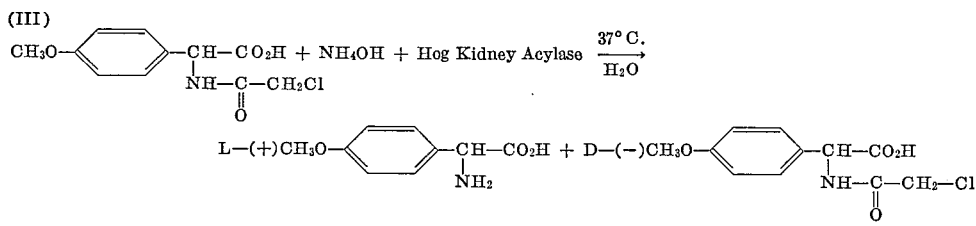

(IV) 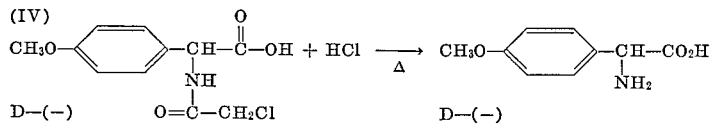

(V) 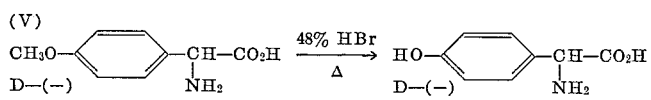

(I) dl-2-(p-methoxyphenyl)glycine.—To a stirred solution of 19.6 g. (0.4 mole) of NaCN in 80 ml. of H$_2$O was added 23.6 g. (0.450 mole) of NH$_4$Cl and 20 ml. of conc. NH$_4$OH followed by 54.5 g. (0.4 mole) of anisaldehyde in 160 ml. of methanol and the temperature maintained at 37° C. for two hours. The methanol was then removed in vacuo and the remaining mixture extracted with two 150 ml. portions of methyl isobutyl ketone (MIBK) and combined. The combined MIBK extracts were washed once with 30 ml. of H$_2$O and then 240 ml. of 6NHCl added with good mixing and the MIBK was removed in vacuo. The resulting slurry was heated at reflux (now in solution) for two hours. One hundred ml. of H$_2$O was added to the hot solution and then 8 g. of decolorizing carbon added and after ten minutes at gentle reflux the carbon was filtered off and washed with 50 ml. of hot water. The combined filtrates (hot) were stirred and treated with conc. NH$_4$OH until pH 5–6 was obtained (pH paper). The slurry was then cooled to 5° C. and after one hour the crystals were filtered off and washed with two 100 ml. portions of water. The damp cake was then slurred in 250 ml. of water and 50% NaOH added slowly until the product dissolved. Two 300 ml. ether extracts were then taken and discarded. The pH was then adjusted to 5.5 with NHCl with cooling. After one hour the product was filtered off, washed with 3×100 ml. H$_2$O and air dried. Yield 40 g.; dec. 244° C. with sublimation at 230° C.

(II) dl-2-(p-methoxyphenyl) - N - (chloroacetyl)-glycine.—To a stirred suspension of 36 g. (0.2 mole) of dl-2-(p-methoxyphenyl)-glycine in 500 ml. of H$_2$O was added 8 g. (0.2 mole) of NaOH pellets and when a clear solution was obtained the solution was cooled to 5° C. and with vigorous stirring 68.2 g. (0.4 mole) of chloroacetic anhydride (warm) was added all at once. Then a solution of 16 g. (0.4 mole) of NaOH in 100 ml. of H$_2$O was added over a 10 to 15 minute period. More 20% NaOH was added as needed to keep the pH at about 9 for a 1.5 hour period. Next, the pH was adjusted to 2 with 40% H$_3$PO$_4$. The product crystallized immediately and was filtered off, washed with water and recrystallized from ethanol-water to give 38 g. of product melting at 182°–183° C.

Analysis.—Calcd. for C$_{11}$H$_{12}$ClNO$_4$: C, 51.21; H, 4.69. Found: C, 51.49; H, 4.90.

(III) D - (−) - 2 - (p-methoxyphenyl) - N - (chloroacetyl)glycine and L - (+) - 2 - (p-methoxyphenyl) - glycine.—To 800 ml. of H$_2$O stirred at 37° C. was added 38 g. (0.148 mole) of dl-2-(p-methoxyphenyl)-N-(chloroacetyl)glycine and NH$_4$OH added dropwise until pH 7.8 was obtained. To the resulting solution was added 2 g. of Hog Kidney Acylase (Sigma Chemical Company) and stirring continued at 37° C. (internal) for 21 hours. The solids containing crude L-(+)-2-(p-methoxyphenyl)-glycine were then filtered off and washed with 2×100 ml. H$_2$O and the pH of the combined filtrates adjusted to 4–5 with glacial acetic acid. This solution was heated on the steam bath for 30 min. with 5 g. of decolorizing carbon and then filtered. The carbon cake was washed with 50 ml. of warm water and the combined filtrates cooled and acidified to pH 2 with 40% H$_3$PO$_4$. After one hour cooling at 0° C. the crystalline product was filtered off and washed with cold water (3×) and air dried. The yield was 16 g. D-(−)-2-(p-methoxyphenyl)-N-(chloroacetyl)glycine and when a second run using 5× the above amounts were used a yield of 83 g. (87% yield) was obtained M.P. 170°–171° C.;

$[\alpha]_D^{25°C.}$—193° (c.=1%, ethanol)

Analysis.—Calcd. for C$_{11}$H$_{12}$ClNO$_4$: C, 51.21; H, 4.69. Found: C, 51.50; H, 4.99.

When the solids containing crude L-(+)-2-(p-methoxyphenyl)-glycine are treated with hot 3 N HCl (200 ml.) and carbon followed by filtration and pH adjustment to 5.5 there is obtained 6 g. (first run) of pure (L-(+)-2-(p-methoxyphenyl)glycine.

$[\alpha]_D^{25°C.}$+150.4° (c.=1%, 1 N HCl)

(IV) D-(−)-2-(p-methoxyphenyl)-glycine.—The 16 g. of D-(−)-2-(p-methoxyphenyl)-N-(chloroacetyl)glycine was refluxed 1.5 hours in 170 ml. of 2 N HCl. The resulting clear solution was filtered and cooled at 5° C. and the pH adjusted to 5.5 with NH$_4$OH. The product was then filtered off after cooling 30 min. and washed with 3×25 ml. of cold water. The dried material D-(−)-2-(p-methoxyphenyl)-glycine weighed 9.5 g. A second run gave 54 g. using the 83 g. of starting material from III.

$[\alpha]_D^{25°C.}$ —149.9° (c.=1%, 1 N HCl) (first run)

$[\alpha]_D^{25°C.}$ —148.1° (c.=1%, 1 N HCl) (second run)

Analysis.—Calcd. for C$_9$H$_{11}$NO$_3$: C, 59.67; H, 6.13; N, 7.74. Found: C, 59.38; H, 6.16; N, 8.00.

(V) D-(−)-2-(p-hydroxyphenyl)-glycine.—A mixture of 1.81 g. (0.01 mole) of D-(−)-2-(p-methoxyphenyl)-glycine. ($[\alpha]_{25°C.}^D$—149.9° c.=1%. 1 N HCl) and 10 ml. of 48% HBr was heated at gentle reflux for 2 hours. The resulting solution was concentrated at reduced pressure at 30-C. to a wet solid. A minimum amount of water (20° C.) was added to dissolve the HBr salt and with cooling NH$_4$OH was added to pH 5. The resulting thick gel which ppt. was warmed to 50° C. and when solution was nearly obtained a different crystalline form began to ppt. Upon cooling 30 min. at 0°–5° C. there was obtained 990 mg. of cold water washed (3× 1 ml.) and air dried material, D-(—)-2-(p-hydroxyphenyl)glycine.

$[\alpha]^{25°\ C.}$—161.2° (c.=1%, 1 N HCl) dec. pt. 223° C.

A second run using 20× the above amounts gave 24.5 g. of material.

$[\alpha]_D^{25°\ C.}$—153° (C=1%, 1 N HCl)

*Analysis.*—Calcd. for $C_8H_9NO_3$: C, 57.49, H, 5.43; N, 8.39. Found: C, 57.41; H, 5.67; N, 8.39.

The compounds of the present invention are useful in the treatment of infections caused by gram-positive bacteria, including particularly the resistant strains of bacteria and gram-negative bacteria, e.g. penicillin-resistant strains of *Staphylococcus aureus* (*Micrococcus pyogenes* var. *aureous*). In addition, the compounds of the present invention are orally absorbed.

In the treatment of bacterial infections in man, the compounds of this invention are administered orally or parenterally, in accordance with conventional procedures for antibiotic administration, in an amount of from about 5 to 60 mg./kg./day and preferably about 20 mg./kg./day in divided dosage, e.g., three or four times a day. They are administered in dosage units containing, for example, 125 or 250 or 500 mg. of active ingredient with suitable physiologically acceptable carriers or excipients. The dosage units can be in the form of liquid preparations such as solutions, dispersions or emulsions or in solid form such as tablets, capsules, etc.

The following examples will serve to illustrate this invention without limiting it thereto.

EXAMPLE 1

D-(-)-α-amino-α-(3-chloro-4-hydroxyphenyl)-glycine

To a stirred suspension of 5.01 g. (0.03 mole) of D-(—)-2-(p-hydroxyphenyl)glycine in 100 ml. of glacial acetic acid was bubbled in HCl gas at a vigorous rate for about 5 minutes. At first a clear solution resulted and then the hydrochloride salt crystallized out. Next, 4.45 g. (0.033 mole) of sulfuryl chloride (freshly distilled) in 25 ml. of glacial acetic acid was added, with stirring, over a 30 minute period, dropwise. The temperature was 26°–27° C. throughout the addition. After one hour stirring, 250 ml. of dry ether was added slowly and crystallization began. After 15 min. the product was filtered off, washed with dry ether and air dried. The 7 g. obtained was dissolved in 50 ml. of 1 N HCl, filtered, and the pH adjusted, with cooling to 5 with conc. NH$_4$OH. The resulting crystalline product was filtered off after 5 min. standing, washed with two 20 ml. portions of water and 5× with acetone. The vacuum dried material weighed 4.6 g.; dec. pt. 217° C. (sharp). The NMR and IR spectra were consistent with the desired structure.

$[\alpha]_D^{22°\ C.}$—137.1° (c.=1%, 1 N HCl)

*Analysis.*—Calcd. for $C_8H_8ClNO_3$: C, 47.76; H, 4.01; Cl, 17.66. Found: C, 47.16; H, 3.92; Cl, 17.96.

EXAMPLE 2

D-(—)-α-(3-chloro-4-hydroxyphenyl)-α-(t-butoxycarbonylamino)acetic acid

To a stirred suspension of 4.0 g. (0.02 mole) of D-(—)-2-(3-chloro-4-hydroxyphenyl)glycine (finely ground) and 1.6 g. (0.04 mole) of powdered magnesium oxide in 50 ml. of 1:1 dioxane-water was added 5.8 g. (0.04 mole) of t-butoxycarbonylazide (Aldrich Chemical Company Inc.) over a 30 minute period and then stirring continued for 20 hours at 45°–50° C. The resulting turbid solution was then poured into one liter of ice water with stirring. One 600 ml. ethyl acetate extract was taken and this was washed twice with 200 ml. portions of 5% sodium bicarbonate and these aqueous solutions combined and filtered. Next, with cooling, they were acidified to pH 3 with 40% phosphoric acid under a layer of 500 ml. of ethyl acetate. This ethyl acetate extract was separated and combined with two more 100 ml. ethyl acetate extracts and dried over sodium sulfate.. The ethyl acetate solution was then filtered and concentrated under reduced pressure to an oil and 100 ml. of warm benzene added. The resulting solution was filtered. After removing the solvent in vacuo there was obtained 6 g. of an amorphous froth D-(—)-α-(3 - chloro-4-hydroxyphenyl)-α-(t-butoxycarbonylamino) acetic acid. Infrared and NMR analysis revealed only the NH$_2$ group had reacted with the azide.

EXAMPLE 3

7-[D-(—)-α-(t-butoxycarbonylamino)-α-(3-chloro-4-hydroxyphenyl)-acetamido]-cephalosporanic acid To a stirred solution of 4.03 g. (0.02 mole) of D-(—)-α-(2 - chloro-4-hydroxyphenyl)-α-(t-butoxycarbonylamino) acetic acid, 28 ml. of triethylamine (0.02 mole) in 100 ml. of tetrahydrofuran was added 3.64 g. (0.02 mole) of trichloroacetyl chloride in 25 ml. of tetrahydrofuran over a 10 min. period at —40° C. (internal). After an additional 10 min. at —40° C., a pre-cooled solution at —50° C. of 5.44 g. (0.02 mole) of 7–ACA, 5.6 ml. (0.04 mole) of triethylamine in 300 ml. of CH$_2$Cl$_2$ was added all at once. The temperature was maintained at —40° to —30° C. for 30 min. and then the cooling bath was removed and after another 30 min. (T max. 0° C.) the solvent was removed in vacuo at 20° C. The residue was taken up in 150 ml. of H$_2$O and 150 ml. of ether. The ether layer was discarded and the aqueous layered with 150 ml. of ethyl acetate and cooled and stirred while being acidified to pH 2.5. The ethyl acetate extract was washed with water, dried 10 min. over Na$_2$SO$_4$, filtered and conc. to an oil at 20° C. under reduced pressure. The oil was triturated until a solid ppt. with two 200 ml. portions of 1:1 by volume dry ether—Skellysolve "B" (pet. ether). The solids were filtered off and vacuum dried over P$_2$O$_5$. The yield was 7.4 g. dec. pt. 100° C., slowly. The IR and NMR were consistent with the desired structure.

*Analysis.*—Calcd. for $C_{23}H_{26}ClN_3O_9S$: C, 49.64; H, 4.71. Found: C, 49.50; H, 5.48.

EXAMPLE 4

7-[D-(—)-α-amino-α-(3-chloro-4-hydroxyphenyl)-acetamido]-cephalosporanic acid

A solution of 7 g. of D-(—)-7-[α-(t-butoxycarbonylamino)-α-(3 - chloro - 4-hydroxyphenyl)-acetamido]-cepholosporanic acid in 200 ml. of 50% aqueous formic acid was stirred and heated at 40° C. for 3 hours and then the solvents removed in vacuo at 20° C. to leave a glass-like residue. This was further dried by adding 200 ml. of toluene and removing same under reduced pressure at 20° C. The residue was stirred with moist ethyl acetate until solid and the solids filtered off. Next, the solids were stirred with 95% ethanol (200 ml.) for one hour and filtered. There was obtained 2.5 g. of vacuum dried material. This was further purified and crystallized by stirring for 2 hours in a mixture of 12 ml. H$_2$O and 12 ml. of amberlite LA–1 resin (acetate form) 25% in methyl isobutyl ketone (MIBK). The product was filtered off, washed with a little MIBK—H$_2$O (1:1) and finally washed with acetone. The final yield was 450 mg. dec. 100° C. slowly. The IR and NMR were consistent with the desired structure.

*Analysis.*—Calcd. for $C_{16}H_{18}ClN_3O_7S$: C, 47.37; H, 3.94. Found: C, 47.33; H, 4.98.

This product is found to inhibit *Staphylococcus aureus* Smith at a concentration of 2.5 mg./ml., *Streptococcus pyogenes* at a concentration of 0.08 mg./ml., *Staphylococcus aureus* BX–1633–2 (a strain resistant to benzylpenicillin) at a concentration of 3.1 mg./ml. *Escherichia coli Juhl* at a concentration of 6.2 mg./ml., *Salmonella enteritidis* at a concentration of 3.1 mg./ml., and *Diplo-* coccus pneumoniae at a concentration of 1.2 mg./ml., to exhibit upon intramuscular injection in mice a $CD_{50}$ against Staph. aureus Smith of 0.1 mg./kg., against Staph. aureus BX-1633-2 of 4-6 mg./kg., against Salmonella enteritidis of 2.5 mg./kg., against E. coli of 14 mg./kg., against Diplococcus pneumoniae of 2.0 mg./kg. and to exhibit upon oral administration in mice a $CD_{50}$ against Diplococcus pneumoniae of 15.0 mg./kg., Staph. aureus Smith of 0.6 mg. /kg., Staph. aureus BX-1633-2 of 17-19 mg./kg., against Klebsiella pneumoniae of 40 mg./kg. and against E. coli of 37 mg./kg.

A comparison was made of the blood levels obtained in mice upon oral administration of 7-[D-(—)-α-amino-α-(3 - chloro - 4 - hydroxyphenyl)-acetamido]cephalosporanic acid with the blood levels obtained with cephaloglycine 7 - [D-(—)-α-aminophenylacetamido]cephalosporanic acid. In the test eight mice were dosed orally with 2.4 m. moles/kg. of each compound. The following are the average blood levels obtained:

| Time (hours) | Blood levels (mg./ml.), 7-[D-(—)-α-amino-α-(3-chloro-4-hydroxyphenyl)-acetamido] cephalosporanic | |
|---|---|---|
| | Acid | Cephaloglycine |
| 0.5 | 3.85 | 2.4 |
| 1.0 | 2.70 | 1.4 |
| 2.0 | 1.85 | 0.95 |
| 3.5 | 0.8 | 0.95 |

At each time except 3.5 hours the blood level obtained with 7 - [D-(—)-α-amino-α-(3-chloro-4-hydroxyphenyl)-acetamido]cephalosporanic acid is higher than that obtained with cephaloglycine.

EXAMPLE 5

7-[D-(—)-2,2-dimethyl-4-(chloro-4-hydroxyphenyl)-5-oxo-1-imidazolidinyl]cephalosporanic acid A solution of (0.005 mole) of 7-[D-(—)-α-amino-α-(3 - chloro - 4 - hydroxyphenyl) - acetamido]cephalosporanic acid, 0.005 mole) of triethylamine in 50 ml. of acetone and stirring continued for 5 hours. The solution is then concentrated to an oil at 20° C. under reduced pressure. Twenty-five ml. of water and 50 ml. of ethyl acetate is added and the pH adjusted to 3 with 40% phosphoric acid. The aqueous layer is saturated with NaCl and the mixture shaken. The ethyl acetate layer is separated and dried briefly over sodium sulfate, filtered and concentrated to dryness at 20° C. under reduced pressure. The resulting solid precipitate is removed by ether trituration and filtration. After drying over phosphorus pentoxide under vacuum there is the product 7-[D-(—)-2,2-dimethyl-4-(3 - chloro - 4 - hydroxyphenyl)-5--oxo-1-imidazolidinyl]-cephalosporanic acid. Infrared and NMR spectra are consistent with the structure.

This product is found to inhibit Staphylococcus aureus Smith at a concentration of 2.5 mg./ml., Streptococcus pyogenes at a concentration of 0.08 mg./ml. Staphylococcus aureus BX-1633-2 (a strain resistant to benzylpenicillin) at a concentration of 3.1 mg./ml., Escherichia coli Juhl at a concentration of 6.2 mg./ml., Salmonella enteritidis at a concentration of 3.1 mg./ml., and Diplococcus pneumoniae at a concentration of 1.2 mg./ml., to exhibit upon intramuscular injection in mice a $CD_{50}$ against Staph. aureus Smith of 0.1 mg./kg., against Staph. aureus BX-1633-2 of 4-6 mg./kg., Salmonella enteritidis of 2.5 mg./kg., against E. coli of 14 mg./kg. and against Diplococcus pneumoniae of 2.0 mg./kg. and to exhibit upon oral administration in mice a $CD_{50}$ against Diplococcus pneumoniae of 15.0 mg./kg., against Staph. aureus Smith of 0.6 mg. kg., Staph. aureus BX-1633-2 of 17-19 mg./kg. and against Klebsiella pneumoniae of 40 mg./kg. and against E. coli of 37 mg./kg.

EXAMPLE 6

7-[D-(—)-α-amino-α-(3-chloro-4-hydroxyphenyl)-acetamido]-decephalosporanic acid

When in Example 3, 7-aminocephalosporanic acid is replaced by an equimolar amount of 7-aminodecephalosporanic acid there is obtained 7-[D-(—)-α-(t-butoxycarbonylamino) - α - (3 - chloro - 4 - hydroxyphenyl)-acetamido]-decephalosporanic acid. Substitution in Example 4 of an equimolar amount of this compound for 7-[D-(—) - α - (t - butoxycarbonylamino) - α - (3 - chloro-4-hydroxyphenyl) - acetamido] - cephalosporanic acid produces the product 7-[D-(—)-α-amino-α-(3-chloro-4-hydroxyphenyl)-acetamido]-decephalosporanic acid.

This product is found to inhibit Staphylococcus aureus Smith at a concentration of 0.001 percent by weight.

EXAMPLE 7

7-[D-(—)-2,2-dimethyl-1-4-(3-chloro-4-hydroxyphenyl)-5-oxo-1-imidazolidinyl]-decephalosporanic acid When in Example 5, 7-[D-(—)-α-amino-α-(3-chloro-4-hydroxyphenyl)-acetamido]-cephalosporanic acid is replaced by an equimolar amount of 7-[D-(—)-α-amino-α-(3 - chloro - 4 - hydroxyphenyl)-acetamido]-decephalosporanic acid there is obtained the product 7-[D-(—)-2,2 - dimethyl - 4 - (3-chloro-4-hydroxyphenyl)-5-oxo-1-imidazolidinyl]-decephalosporanic acid.

This product is found to inhibit Staphylococcus aureus Smith at a concentration of 0.001 percent by weight.

While this invention has been described and exemplified in terms of its preferred embodiment, those skilled in the art will appreciate that modifications can be made without departing from the spirit and scope of this invention.

I claim:
1. A compound selected from the group consisting of:
   7-[D-(—)-α-amino-α-(3-chloro - 4 - hydroxyphenyl)-acetamido]cephalosporanic acid,
   7-[D-(—)-α-amino-α-(3-chloro - 4 - hydroxyphenyl)-acetamido]decephalosporanic acid,
   7-[D-(—)-2,2-dimethyl-4-(3-chloro-4-hydroxyphenyl)-5-oxo-1-imidazolidinyl]cephalosporanic acid and
   7-[D-(—)-2,2-dimethyl-4-(3-chloro-4-hydroxyphenyl)-5-oxo-1-imidazolidinyl]decephalosporanic acid and the nontoxic, pharmaceutically acceptable salts thereof.
2. The compound of claim 1 named:
   7-[D-(—)-α-amino-α-(3-chloro - 4 - hydroxyphenyl)-acetamido]cephalosporanic acid.
3. A nontoxic, pharmaceutically acceptable salt of the compound of claim 2.
4. The sodium salt of the compound of claim 2.
5. The potassium salt of the compound of claim 2.
6. The triehylamine salt of the compound of claim 2.
7. The compound of claim 1 named:
   7-[D-(—)-α-amino-α-(3-chloro - 4 - hydroxyphenyl)-acetamido]decephalosporanic acid.
8. A nontoxic, pharmaceutically acceptable salt of the compound of claim 7.
9. The sodium salt of the compound of claim 7.
10. The potassium salt of the compound of claim 7.
11. The triethylamine salt of the compound of claim 7.
12. The compound of claim 1 named:
    7-[D-(—)-2,2-dimethyl-4-(3-chloro-4-hydroxyphenyl)-5-oxo-1-imidazolidinyl]cephalosporanic acid and its nontoxic, pharmaceutically acceptable salts.
13. The compound of claim 1 named:
    7-[D-(—)-2,2-dimethyl-4-(3-chloro-4-hydroxyphenyl)-5-oxo-1-imidamolidinyl]decephalsosporanic acid and its nontoxic, pharmaceutically acceptable salts.

No references cited.

NICHOLAS S. RIZZO, Primary Examiner

U.S. Cl. X.R.
260—999

PO-1050
(5/69)

UNITED STATES PATENT OFFICE
CERTIFICATE OF CORRECTION

Patent No. 3,489,751    Dated January 13, 1970

Inventor(s) Leonard Bruce Crast, Jr.

It is certified that error appears in the above-identified patent and that said Letters Patent are hereby corrected as shown below:

Column 1, line 50, "-acetamido]" should be cancelled; line 63, -- 3-methyl- -- should be inserted before "7";

Column 2, line 1, "5" should read -- 4 --; lines 13-21 that part of Formula III reading $\underset{CCOH}{|}$ should read $\underset{COOH}{|}$ line 22, -- 3-methyl- -- should be inserted before "7"; line 26, "5" should read -- 4 --; lines 27-35, that part of Formula IV reading $-\underset{\underset{N}{C}}{CH}-CH$ should read $-\underset{\underset{C-N}{C}}{CH}-CH$; line 62, -- 3-methyl- -- should be inserted before "7";

Column 3, line 49, -- 3-methyl- -- should be inserted before "7";

Column 4, line 7, "methods for" should be cancelled; line 28, "be", first occurence, should be cancelled; lines 44-54, that part of the formula reading $\underset{\underset{COOH}{C}}{C}-CH_2-R$ should read

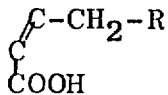

PO-1050
(5/69)

UNITED STATES PATENT OFFICE
CERTIFICATE OF CORRECTION

Patent No. 3,489,751             Dated January 13, 1970

Inventor(s) Leonard Bruce Crast, Jr.       - 2 -

It is certified that error appears in the above-identified patent and that said Letters Patent are hereby corrected as shown below:

Column 5, lines 1-5, that part of the first formula in equation II reading $-\underset{\underset{NH}{|}}{CH}-$ should read $-\underset{\underset{NH_2}{|}}{CH}-$; line 49, "NHCl" should read -- 6N HCl --;

Column 9, line 39, "(chloro" should read -- (3-chloro --

Column 10, lines 2, 5, 6, 12, 18, 22, 24, 38, 42, 55 and 67, -- 3-methyl- -- should be inserted before "7", each occurence; line 18, "dimethyl-1-4(" should read -- dimethyl-4( --; line 68, "decephalsosporanic" should read -- decephalosporanic --.

Signed and sealed this 6th day of February 1973.

(SEAL)
Attest:

EDWARD M. FLETCHER, JR.           ROBERT GOTTSCHALK
Attesting Officer                  Commissioner of Patents